(12) United States Patent
Li (10) Patent No.: US 10,729,302 B2
(45) Date of Patent: Aug. 4, 2020

(54) SEWAGE COLLECTION AND DETECTION MECHANISM AND CLEANING DEVICE (71) Applicant: HiZero Technologies Co., Ltd., Shenzhen (CN)

(72) Inventor: Yang Li, Guangdong (CN)

(73) Assignee: HiZero Technologies Co., Ltd., Shenzhen (CN)

( * ) Notice: Subject to any disclaimer, the term of this patent is extended or adjusted under 35 U.S.C. 154(b) by 33 days.

(21) Appl. No.: 16/044,932

(22) Filed: Jul. 25, 2018

(65) Prior Publication Data

US 2019/0246861 A1 Aug. 15, 2019

Related U.S. Application Data (63) Continuation-in-part of application No. PCT/CN2018/076686, filed on Feb. 13, 2018.

(51) Int. Cl.
*A47L 11/40* (2006.01)
*C02F 9/00* (2006.01)

(52) U.S. Cl.
CPC ........ *A47L 11/4019* (2013.01); *A47L 11/4025* (2013.01); *C02F 9/00* (2013.01); *C02F 2301/08* (2013.01); *C02F 2303/04* (2013.01)

(58) Field of Classification Search
CPC .... A47L 11/4019; A47L 11/4025; C02F 9/00; C02F 2301/08; C02F 2303/04
See application file for complete search history.

(56) References Cited

U.S. PATENT DOCUMENTS

| 2,528,375 | A | | 10/1950 | Lilly |
| 3,552,100 | A | | 1/1971 | Ekenberg |
| 4,233,706 | A | | 11/1980 | Kauffeldt |
| 4,595,420 | A | * | 6/1986 | Williams, III .......... A47L 11/30 |
| | | | | 134/21 |
| 5,074,718 | A | * | 12/1991 | Ushitora ................. E03F 1/007 |
| | | | | 406/151 |
| 10,022,032 | B1 | | 7/2018 | Li et al. |
| 10,039,431 | B1 | | 8/2018 | Li et al. |
| 2011/0119950 | A1 | | 5/2011 | Ho et al. |

(Continued)

FOREIGN PATENT DOCUMENTS

CN  204690657 U  10/2015
CN  205994472 U  3/2017

(Continued)

OTHER PUBLICATIONS

Great Britian Search Report, Great Britain application No. GB1813657.2, dated Jan. 28, 2019.

(Continued)

*Primary Examiner* — Dung Van Nguyen
(74) *Attorney, Agent, or Firm* — Cooper Legal Group, LLC (57) ABSTRACT A sewage collection and detection mechanism (10) and a cleaning device (100) are disclosed. The sewage collection and detection mechanism (10) comprises: a recovery tank (11), having an open top and having a tank central axis perpendicular to a horizontal plane. A sewage inlet pipe (12) is connected to the recovery tank (11) and a water level detector (13) is located in the recovery tank (11). The water level detector (13) has a detection probe (131). The detection probe (131) is located on the tank central axis of the recovery tank (11).

20 Claims, 8 Drawing Sheets

(56) References Cited

U.S. PATENT DOCUMENTS

| | | | | |
|---|---|---|---|---|
| 2013/0105408 A1* | 5/2013 | Bradley | ............ | B01F 3/04609 |
| | | | | 210/758 |
| 2017/0119225 A1* | 5/2017 | Xia | ................... | A47L 11/4083 |
| 2018/0206689 A1 | 7/2018 | Li et al. | | |
| 2018/0310795 A1 | 11/2018 | Li et al. | | |
| 2018/0338660 A1 | 11/2018 | Li et al. | | |
| 2019/0246861 A1 | 8/2019 | Li | | |

FOREIGN PATENT DOCUMENTS

| | | |
|---|---|---|
| CN | 106725138 A | 5/2017 |
| CN | 206945096 U | 1/2018 |
| CN | 207959079 U | 10/2018 |
| CN | 110785638 A | 2/2020 |
| DE | 202016105301 U1 | 10/2016 |
| EP | 3238595 A1 | 11/2017 |
| EP | 3238598 A1 | 11/2017 |
| EP | 3524121 A1 | 8/2019 |
| GB | 1247875 A | 9/1971 |
| GB | 1247878 A | 9/1971 |
| GB | 1288763 A | 9/1972 |
| JP | S55-082778 | 6/1980 |
| JP | 2003135347 A | 5/2003 |
| JP | 2010054147 A | 3/2010 |
| JP | 2019136484 A | 8/2019 |
| WO | 9518685 | 7/1995 |
| WO | 2019157644 A1 | 8/2019 |

OTHER PUBLICATIONS

European Extended Search Report, European patent application No. 18250017.3, dated May 3, 2019.

Corresponding International Patent Application No. PCT/CN2018/076686, International Search Report, dated Oct. 31, 2018. English Translation.

Office Action for Corresponding Japanese Patent Application No. 2018-219918, dated Nov. 13, 2019. English Translation.

Examination Report for Corresponding Great Britain Patent Application No. GB1813657.2, dated Apr. 14, 2020.

\* cited by examiner

SEWAGE COLLECTION AND DETECTION MECHANISM AND CLEANING DEVICE

RELATED APPLICATIONS

This application is a continuation-in-part of and claims priority to PCT/CN2018/076686, tiled on Feb. 13, 2018, which is incorporated herein by reference.

FIELD OF THE DISCLOSURE

The disclosure relates to the technical field of cleaning machinery and, in particular to, a sewage collection and detection mechanism and a cleaning device.

BACKGROUND OF THE DISCLOSURE

In general, there are mainly three types of vacuum cleaners: wet, dry, and wet and dry. Dry vacuum cleaners are cleaned by means of filters, which filter only dry media such as dust and cannot pick up wet media. Wet vacuum cleaners can pick up wet media such as detergents and water. In wet vacuum cleaners, a wet type medium is sprayed first, and then the wet type medium and the dirt contained in the wet type medium are sucked up to perform the cleaning operation. In the wet vacuum cleaner there is a device, for example a separation tank, for separating air from water that is sucked into the wet vacuum cleaner together with the air. The wet and dry vacuum cleaner combines the functions of a dry vacuum cleaner and a wet vacuum cleaner.

The wet and dry vacuum cleaner includes a body, and a recovery tank is arranged in the body. The recovery tank is used for containing sewage generated after the vacuum cleaner cleans the floor. When the wet and dry vacuum cleaner is not in use, the body is generally maintained vertically. When the wet or dry vacuum cleaner is being used for cleaning operations, the body is maintained in a tilted state. During this time, the recovery tank inside the body will also tilt with the body. Because the sensing probe of the water level detector is placed near the sidewall of the recovery tank and the sewage tilts along with the recovery tank, the sensing probe of the water level detector will contact with the sewage before the recovery tank is full of sewage, resulting in an erroneous full water level alarm. Therefore, there is a problem in that e water level alarm is not accurate enough and results in false positives.

SUMMARY OF THE DISCLOSURE

According to various embodiments of the present application, a sewage collecting and detecting mechanism and a cleaning device are provided. The sewage collection and detection mechanism includes a recovery tank with a top opening, the recovery tank has a tank central axis perpendicular to a horizontal plane. A sewage inlet pipe is arranged at the bottom of the recovery tank, and a water level detector is disposed in the recovery tank. The water level detector has a detection probe, and the detection probe is located on the tank central axis of the recovery tank.

The cleaning device includes the above-described sewage collection and detection mechanism. The details of one or more embodiments of the disclosure are set forth in the accompanying drawings and the description below. Other features, objects, and advantages of the disclosure will be apparent from the description and drawings, and from the claims.

DETAILED DESCRIPTION OF THE EMBODIMENTS

Figure 1:
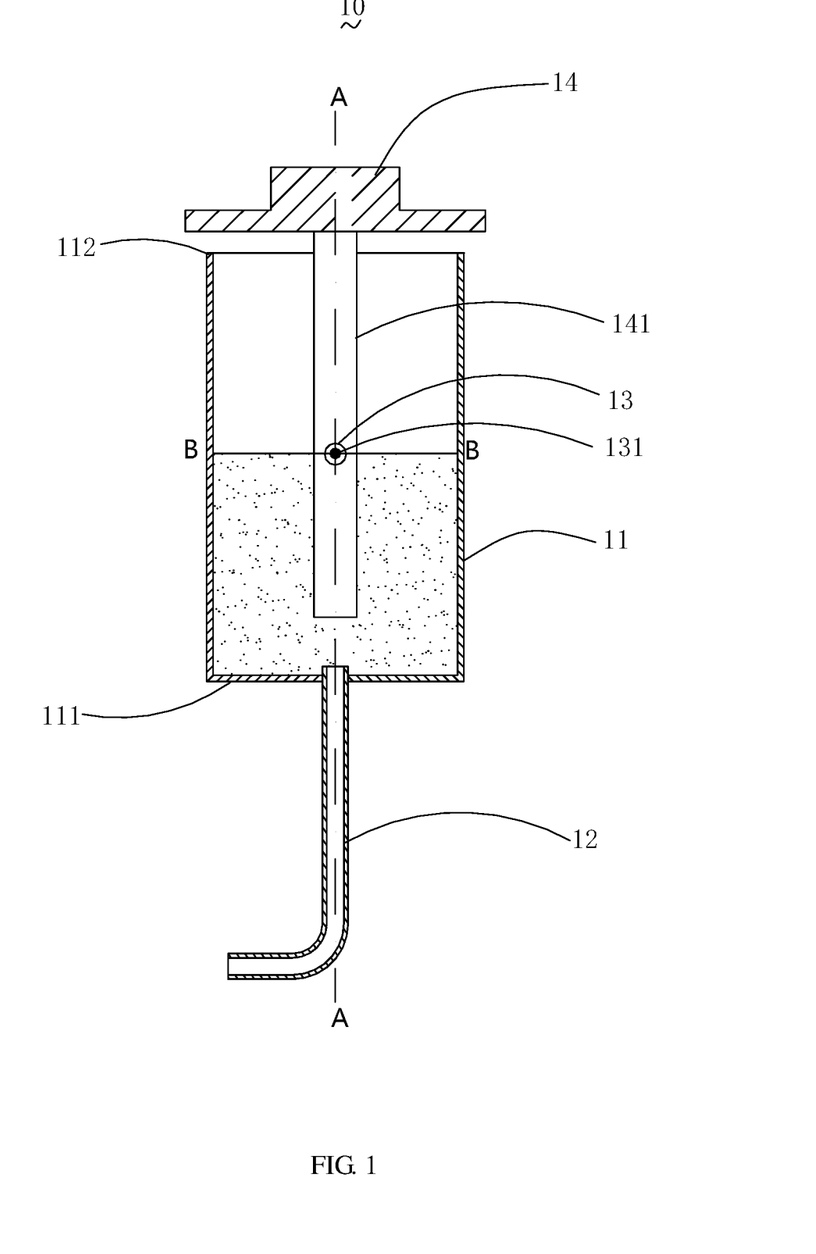
FIG. 1 is a cross-sectional view of an embodiment of the sewage collection and detection mechanism in a vertical state.

Referring to FIG. 1, a sewage collection and detection mechanism 10 of an embodiment includes a recovery tank 11, a sewage inlet pipe 12, and a water level detector 13 provided in the recovery tank 11. The sewage inlet pipe 12 is provided on the bottom of the recovery tank 11 for inputting the sewage into the recovery tank 11.

The top of the recovery tank 11 is open. The recovery tank 11 has a tank central axis AA perpendicular to the horizontal plane. The shape of the recovery tank 11 may be selected from the group consisting of a cylindrical shape, a square tube shape, a diamond shape, and a regular polygonal tube shape. In the present embodiment, the recovery tank 11 has a cylindrical shape. The tank central axis of the recovery tank 11 is defined as if the shape of the recovery tank 11 is a rotating body, and the tank central axis of the recovery tank 11 is the vertical axis of rotation of the vertical axis of rotation of the rotating body. If the shape of the recovery tank 11 is non-rotating, then, the tank central axis AA is a set of points equally spaced relative to each side of the recovery tank. 11. That is, any point on the tank central axis AA is equal in the distance to each side of the recovery tank 11.

Figure 2:
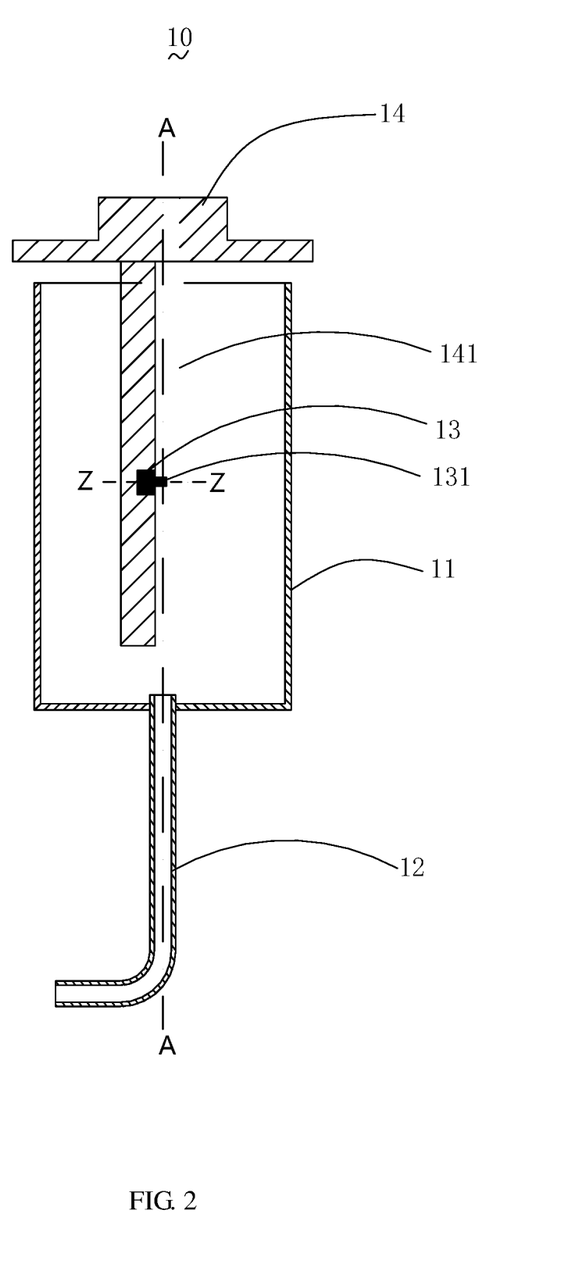
FIG. 2 is a cross-sectional view of the sewage collection and detection mechanism shown in FIG. 1 at another angle.
Figure 3:
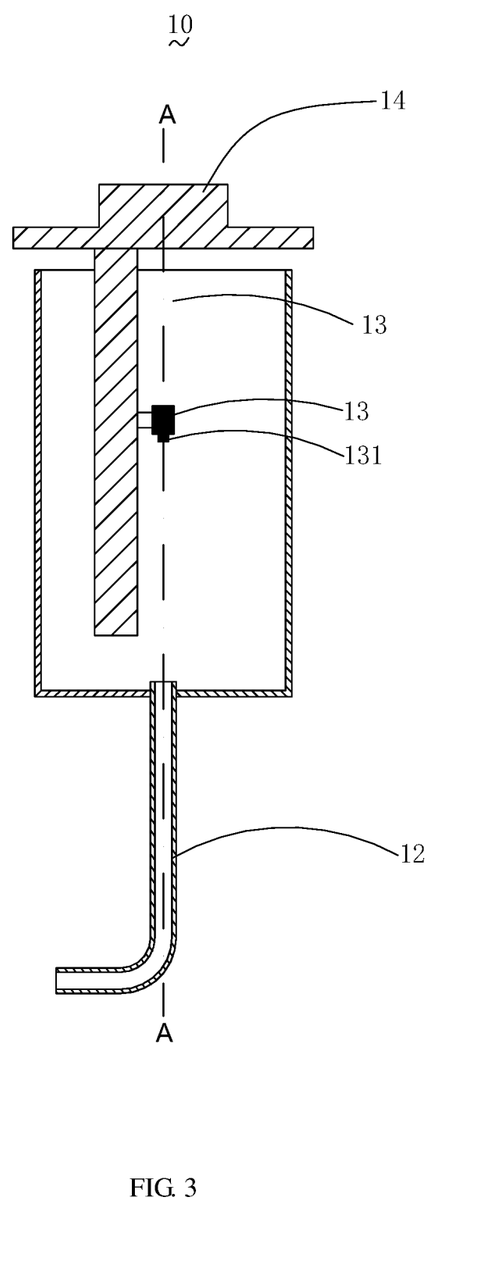
FIG. 3 is a cross-sectional view of another embodiment of the sewage collection and detection mechanism in a vertical state.

The water level detector 13 has a detection probe 131 which is located on the tank central axis AA of the recovery tank 11 and is used to detect the water level of the sewage in the recovery tank 11. In the present embodiment, the detection probe 131 has a substantially cylindrical shape with a probe central axis ZZ penetrating the cylindrical top and bottom surfaces. As shown in FIG. 2, the probe central axis ZZ is perpendicular to the tank central axis AA. In this case, in order to accurately detect the level of the sewage, the length of the detection probe 131 in the direction along the probe central axis ZZ is required to be as small as possible, preferably not longer than 10 mm. In other embodiments, as shown in FIG. 3, the probe central axis ZZ of the detection probe 131 may also coincide with the tank central axis AA of the recovery tank 11. In this case, the length of the detection probe 131 along the probe central axis ZZ is not limited and can be set according to actual needs.

Figure 4:
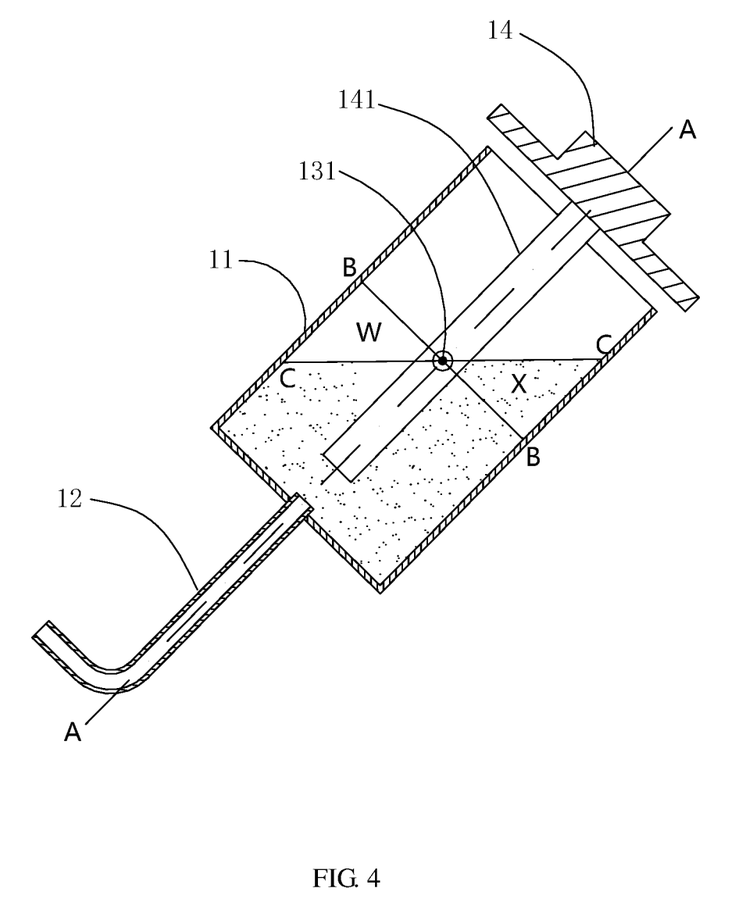
FIG. 4 is a cross-sectional view of the sewage collection and detection mechanism shown in FIG. 1 in an inclined state.

The specific working principle of the sewage collection and detection mechanism 10 will be described in detail below with reference to FIGS. 4 and 5. Please refer to FIG.

4. FIG. 4 is a cross-sectional view of the sewage collection and detection mechanism 10 when it is in an inclined state. In FIG. 4, the BB line is the horizontal alarm water line of the detection probe 131 when the recovery tank 11 is vertical, and the CC line is an inclined alarm water level line of the detection probe 131. As can be seen from FIG. 4, the intersection of the BB line and the CC line forms a region X containing water and a region W without water. The region X is located above the region W because of the intersection point of the BB line and the CC line is the position where the detection probe 131 is located. The detection probe 131 is located on the tank central axis AA of the recovery tank 11 so that the area X is equal to the area W. Therefore, it can be seen that the volume of the sewage when the alarm water level line is the horizontal BB line is equal to the volume of the sewage when the alarm water level is the CC line.

Figure 5:
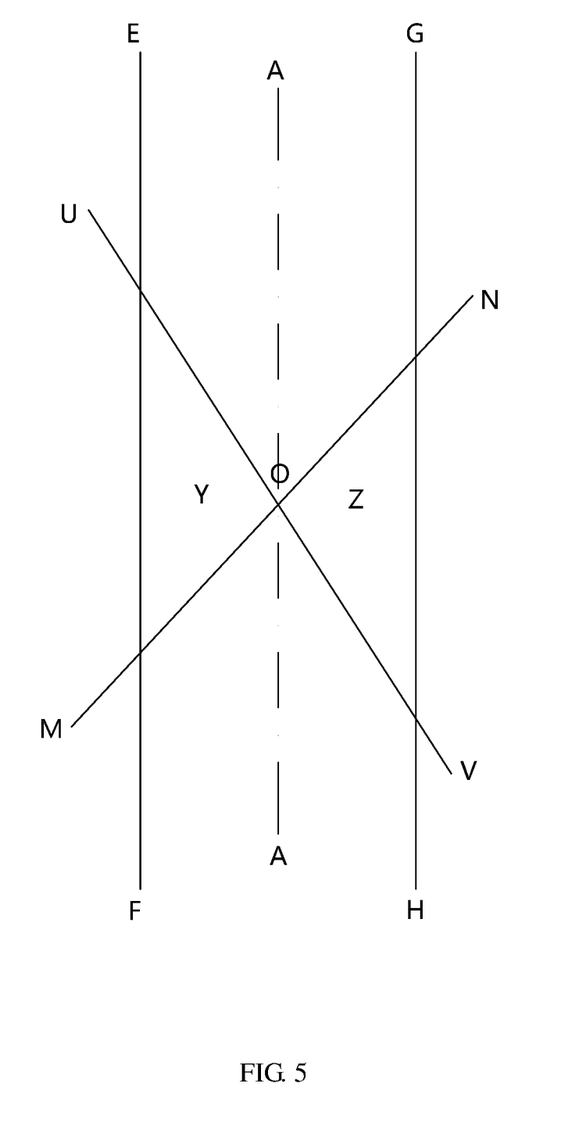
FIG. 5 is a schematic diagram of the principle of sewage water level detection.

Referring to FIG. 5, FIG. 5 is a geometric diagram of the detection of sewage water level. In FIG. 5, the inclined straight lines MN and UV are equivalent to two different tilting angle alarm water level lines, and the intersection point MN and UV can be regarded as a detection probe 131 simplified to a point. The relatively parallel straight lines EF and GH are the inner walls of the recovery tank 11, and the lines EF and GH are equidistance from the tank central axis AA of the recovery tank 11. MN and UV intersect to form an area Y and an area Z.

Since the focal point O of MN and UV is on the tank central axis AA of the recovery tank 11, the area of Y is equal to the area of Z. Therefore, it can be seen that the volume of the sewage, when the alarm water level line is the inclined MN line, is equal to the volume of the sewage when the alarm water level line is the inclined UV line. In summary, as can be seen in connection with FIG. 4 and FIG. 5, the detection probe 131 provided by the water level detector 13 is on the tank central axis AA of the recovery tank 11, and the distance between the detection probe 131 from an upper edge of the recovery tank 11 on the tank central axis AA is greater than or equal to the radius of the line BB of the recovery tank 11. When the sewage in the recovery tank 11 reaches the specified volume, whether the recovery tank 11 is vertical or inclined, and no matter how inclined, the detection probe 131 is on the alarm water level line. Therefore, it is possible to correctly express the true information of the sewage water level volume, and it is possible to promptly alarm when the sewage reaches a specified volume. Therefore, the alarm will be timely, which can reduce the number of times the waste is poured.

In the present embodiment, the number of detection probes 131 is one, which is only used to measure the water level when the sewage in the recovery tank 11 reaches a specified numerical volume. For example, the detection probe 131 is only for detecting the water level line when the sewage reaches 80% of the volume of the recovery tank 11. When the water level line of the sewage has a volume of 80% of the volume of the recovery tank 11, the sewage is in contact with the detection probe 131 and an alarm is issued from the external alarm. The water level detector may be a capacitive water level switch, and the detection probe may be a capacitive probe of the capacitive water level switch. When the water level of the sewage in the recovery tank 11 reaches the position where the capacitive probe is located, an external alarm will cause an alarm.

Figure 6:
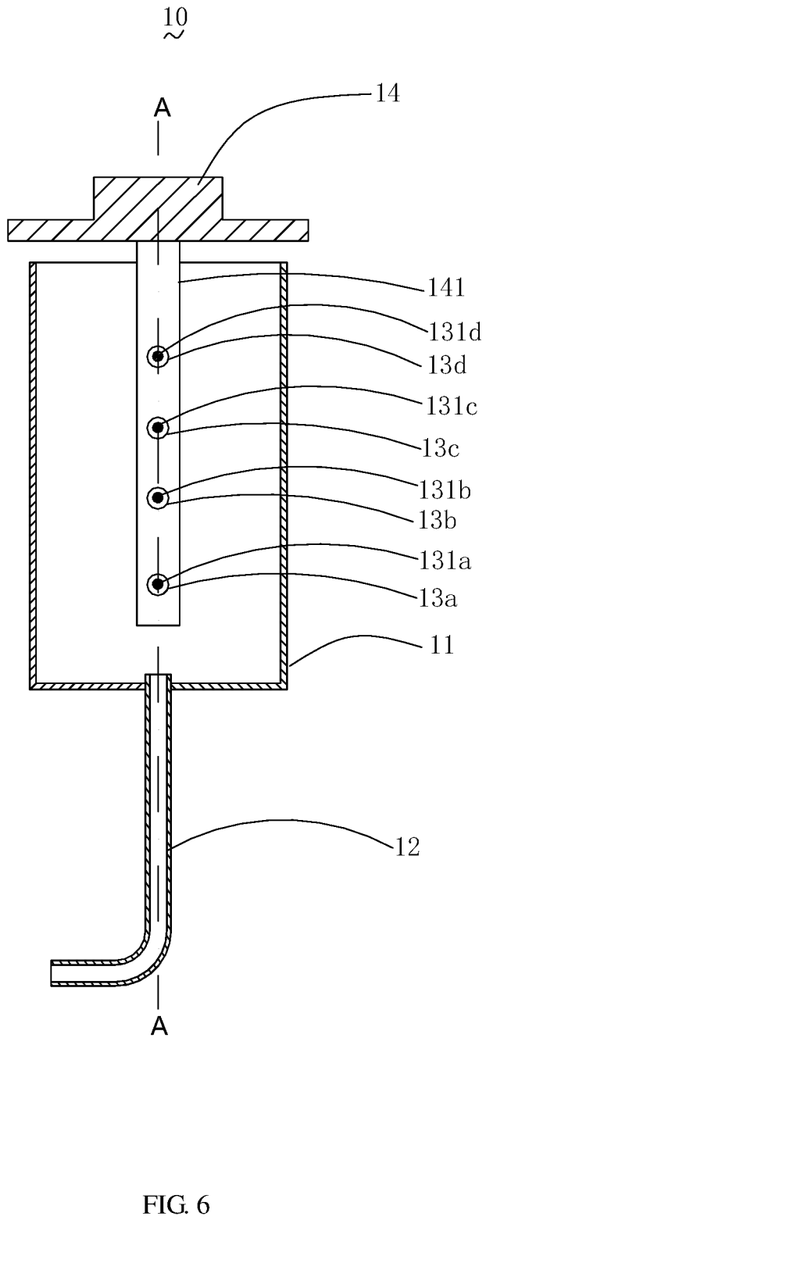
FIG. 6 is a cross-sectional view of another embodiment of the sewage collection and detection mechanism in a vertical state.

In one embodiment, there are multiple water level detectors 13 that are spaced along the tank central axis AA of the recovery tank 11. Each water level detector 13 is located on the tank central axis AA, and the probe central axis ZZ of the detection probe 131 of each water level detector 13 is perpendicular to the tank central axis AA. For example, as shown in FIG. 6, the water level detector 13 includes a low water level detector 13a, a middle water level detector 13b, a high water level detector 13c, and a dangerous water level detector 13d. A low detection probe 131a of the low water level detector 13a, a middle detection probe 131b of the middle water level detector 13b, a high detection probe 131c of the high water level detector 13c, and a dangerous water level detection probe 131d of the dangerous water level detector 13d perform a classification warning for the sewage in the recovery tank 11 at a low water level, a medium water level, a high water level, and a dangerous water level, respectively.

The sewage collection and detection mechanism 10 also includes a cover 14 covering the top of the recovery tank 11 to prevent overflow of sewage from the recovery tank 11 when the recovery tank 11 is tilted. Further, the cover 14 extends toward the inside of the recovery tank 11 and is formed with a fixing rod 141. The water level detector 13 is mounted on the fixing rod 141. Of course, the method of mounting the water level detector 13 is not limited to the above-mentioned method, and other methods that can realize the mounting of the water level detector 13 can also be used here. For example, the water level detector 13 is directly mounted on the cover 14, and for example, is secured by other fixing members that connect to the sidewalls of the recovery tank 11.

Figure 7:
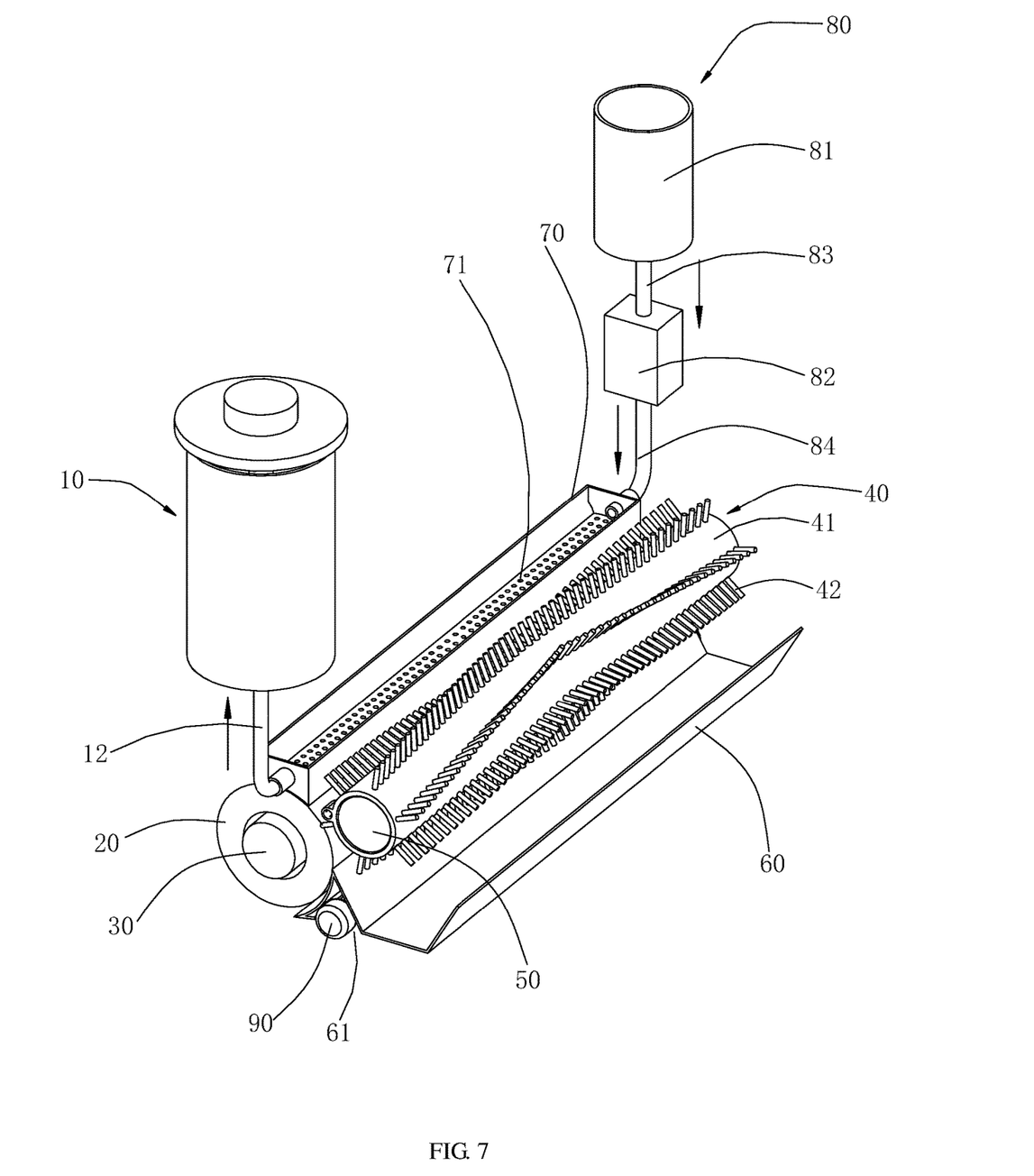
FIG. 7 is a schematic structural view of a cleaning apparatus according to an embodiment.

The present disclosure also discloses a cleaning device 100 for a wet and dry vacuum cleaner. Referring to FIG. 7, the cleaning device 100 includes a flexible tube 20, a first drive member 30 connected to one end of the flexible tube 20, a garbage collection box 60 provided on one side of the flexible tube 20 and having an open top, a roller brush 40 provided at the open top of the garbage collection box 60 and adjacent to the flexible tube 20, a second drive member 50 connecting to one end of the roller brush 40 and corresponding to a water tank 70 of the flexible tube 20, a clean water supply mechanism 80 that communicates with an inner cavity of the water tank 70 and the sewage collection and detection mechanism 10, and the sewage inlet pipe 12 of the sewage collection and detection mechanism 10 communicates with the inner cavity of the water tank 70.

The flexible tube 20 is rotated under the driving force of the first driving member 30 to remove the sewage and dirt on the ground. The outer surface of the flexible tube 20 is coated with a layer of absorbent material that can be used to adsorb the sewage on the ground. (not shown in figures). In the present embodiment, the first driving member 30 is a motor. The roller brush 40 is rotated under the driving force of the second driving member 50 to brush away garbage that adheres to the surface of the flexible tube 20 to clean the flexible tube 20. Specifically, the roller brush 40 includes a roller shaft 41 connected to the second driving member 50, and bristles 42 are provided on a surface of the roller shaft 41. In the present embodiment, the second driving member 50 is a motor.

Figure 8:
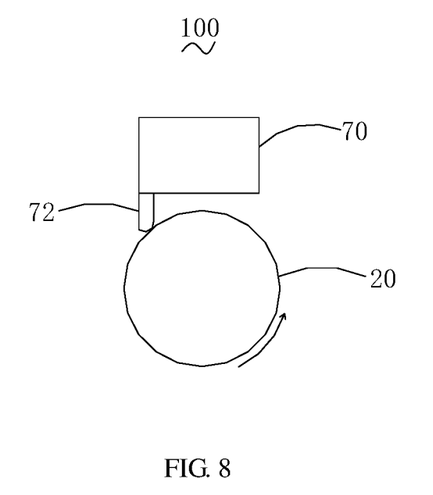
FIG. 8 is a schematic structural view of a water tank and a flexible tube after being assembled in FIG. 7.

The garbage collection box 60 is used to collect garbage brushed off the flexible tube 20 by the roller brush 40. In this embodiment, the garbage collection box 60 is formed by bending a piece of sheet metal or is injected and molded by a mold plastic. The inner capacity of the garbage collection box 60 is arranged to have a wide upper portion and narrow lower portion. The water tank 70 is located above the flexible tube 20 and extends along the axial direction of the flexible tube 20. The bottom of the water tank 70 is provided with a through hole 71. The through hole 71 communicates with the inner cavity of the water tank 70, as shown in FIG. 8. One side of the water tank 70, which located at the bottom of the water tank 70, is provided a pressing protrusion 72, and an end of the pressing protrusion 72 away from the water tank 70 is pressed against the flexible tube 20 for pressing the flexible tube 20 when the flexible tube 20 rotates to squeeze the sewage out of the flexible tube 20. The through hole 71 is used for spraying clean water in the water tank 70 onto the flexible tube 20, and for pressing the sewage discharged from the flexible tube 20 into the water tank 70.

In one embodiment, the surface of one end of the pressing protrusion 72 that is pressed against the flexible tube 20 is arc-shaped. By setting the surface of the end of the flexible tube 20 pressed by the pressing protrusion 72 to have an arc shape, the pressing protrusion 72 can be prevented from scratching the flexible tube 20.

In this embodiment, the clean water supply mechanism 80 includes a clean water tank 81, a water pump 82, a first water pipe 83 connecting the clean water tank 81 and the water pump 82, and a second water pipe 84 connecting the water pump 82 and the water tank 70. The water pump 82 is used to drive the clean water in the clean water tank 81 to automatically enter the water tank 70. In one embodiment, the clean water supply mechanism 80 also includes a clean water level sensor. The clean water level sensor is disposed in the water inlet of the first water pipe 83 for detecting whether there is water in the clean water tank 81. If it is detected that there is no water in the clean water tank 81, and an external alarm sounds a corresponding alarm sound. In one embodiment, the clean water supply mechanism 80 is only a soft water pipe connected to the water tank 70, and is provided with clean water by connecting an external water source of the water tank 70.

The cleaning device 100 further includes a weight-bearing wheel 90. A side of the garbage collection box 60 adjacent to the flexible tube 20 is formed with a receiving groove 61. An opening of the receiving groove 61 faces downward, and the weight-bearing wheel 90 is located in the receiving groove 61 for carrying the entire weight of the wet and dry vacuum cleaner, so as to reduce the user's effort to push the entire wet-and-dry vacuum cleaner to move through the weight-bearing wheel 90. The specific working principle of the above-mentioned cleaning device 100 is as follows: when the flexible tube 20 is cleaned, the clean water of the clean water tank 81 first enters the water tank 70 under the action of the water pump 82, and then is sprayed on the water absorption layer of the flexible tube 20 through the through hole 71. The water absorption layer absorbs clean water and dilutes the sewage that has been absorbed. After the dilution is complete, the clean water supply mechanism 80 stops the clean water supply, the first driving member 30 drives the flexible tube 20 to rotate, and the pressing protrusion 72 presses the rotating flexible tube 20 so that the diluted sewage in the flexible tube 20 is extruded and squeezed. The effluent enters the water tank 70 through the through hole 71. The sewage collection and detection mechanism 10 collects the sewage in the water tank 70, and the sewage enters the recovery tank 11. The sewage collection and detection mechanism 10 recovers the sewage in the water tank 70 in two ways. The first method is that the water tank 70 is completely sealed and the flexible tube 20 is pressed. After the sewage is discharged, the sewage is pushed up by using the pressure of the sewage pumped into the water tank 70. The second method is to use an air pump. The air pump extracts the air from the recovery tank 11, so that a negative pressure is generated in the recovery tank 11. The sewage in the water tank 70 is squeezed into the sewage tank under the force of the external atmospheric pressure.

In the present embodiment, the sewage collection and detection mechanism 10 adopts the first method. After the sewage collection and detection mechanism 10 collects the sewage in the recovery tank 11, the above operation steps are repeated. With the repetition of the above operation steps, the sewage in the recovery tank 11 gradually increases and the water level gradually increases. When the water level of the sewage in the recovery tank 11 reaches the position where the detection probe 131 is located, the external alarm will warn the user to promptly empty the sewage in the recovery tank 11 to ensure that the subsequent cleaning work can continue.

The above-mentioned cleaning device 100 can realize the automatic cleaning of the flexible tube 20 and can also accurately detect when the sewage in the recovery tank 11 reaches a specified volume, so that the user can empty the sewage in the recovery tank 11 in time in order to enable the flexible tube 20 to perform subsequent cleaning work. The technical features of the above-described embodiments may be combined arbitrarily. To make the description succinct, all the possible combinations of the technical features in the above embodiments are not described. However, as long as there is no contradiction in the combination of these technical features, all should be considered as described in this specification. The above-mentioned embodiments merely represent several embodiments of the present disclosure, and the description thereof is more specific and detailed, but it should not be construed as limiting the scope of the disclosure. It should be noted that, for those skilled in the art, several variations and improvements may be made without departing from the concept of the present disclosure, and these are all within the protection scope of the present disclosure. Therefore, the scope of protection of the present invention shall be subject to the appended claims.

The invention claimed is:

1. A sewage collection and detection mechanism, comprising:
    a recovery tank, wherein:
        a top of the recovery tank is open, and
        the recovery tank has a tank central axis perpendicular to a horizontal plane;
    a cover that covers the top of the recovery tank, wherein the cover extends inwardly toward the recovery tank to form a fixing rod:
    a sewage inlet pipe provided at a bottom of the recovery tank; and
    a water level detector provided in the recovery tank and mounted on the fixing rod, wherein:
        the water level detector has a detection probe, and
        the detection probe is located on the tank central axis of the recovery tank.

2. The sewage collection and detection mechanism according to claim 1, wherein:
    the detection probe has a probe central axis that is perpendicular o the tank central axis of the recovery tank, and
    a length of the detection probe in an axial direction of the detection probe is shorter than or equal to 10 mm.

3. The sewage collection and detection mechanism according to claim 2, wherein the water level detector is a capacitive water level switch.

4. The sewage collection and detection mechanism according to claim 2, wherein the sewage collection and detection mechanism comprises a plurality of the water level detectors arranged along the tank central axis of the recovery tank.

5. The sewage collection and detection mechanism according to claim 1, wherein:
the detection probe has a probe central axis, and
the probe central axis coincides with the tank central axis of he recovery tank.

6. The sewage collection and detection mechanism according to claim 5, wherein the water level detector is a capacitive water level switch.

7. A cleaning device, comprising:
a sewage collection and detection mechanism, comprising:
a recovery tank, wherein:
a top of the recovery tank is open, and
the recovery tank has a lank central axis perpendicular to a horizontal plane;
a sewage inlet pipe provided at a bottom of the recovery tank; and
a water level detector provided in the recovery tank, wherein:
the water level detector has a detection probe, and
the detection probe is located on the tank central axis of the recovery tank;
a flexible tube having a water absorption layer on a surface of the flexible tube;
a first driving member connected to one end of the flexible tube;
a garbage collection box provided on one side of the flexible tube and having an open top;
a roller brush located at the open top of the garbage collection box and adjacent to the flexible tube;
a second driving member connected to one end of the roller brush, wherein:
a water tank is disposed corresponding to the flexible tube,
the water tank is located above the flexible tube,
a pressing protrusion is located at a bottom of the water tank,
one end of the pressing protrusion located away from the water tank is pressed against the flexible tube,
the bottom of the water tank is provided with a plurality of through holes, and
the plurality of through holes communicate with an inner cavity of the water tank; and
a clean water supply mechanism connecting to the water tank, wherein the sewage inlet pipe of the sewage collection and detection mechanism communicates with the water tank.

8. The cleaning device according to claim 7, wherein an end surface of the pressing protrusion pressed against one end of the flexible tube is arc-shaped.

9. The cleaning device according to claim 7, wherein the garbage collection box is formed by bending a sheet of sheet metal.

10. The cleaning device according to claim 7, wherein an interior of the garbage collection box has a wide upper portion and a narrow lower portion.

11. The cleaning device according to claim 7, wherein:
the clean water supply mechanism comprises a clean water tank and a water pump,
a first water pipe connects the clean water tank and the water pump, and
a second water pipe connects the water pump and the water tank.

12. The cleaning device according to claim 11, wherein:
the clean water supply mechanism further comprises a clean water level detector, and
the clean water level detector is disposed in a water inlet of the first water pipe.

13. The cleaning device according to claim 7, wherein the clean water supply mechanism is a hose connecting to the water tank.

14. The cleaning device according to claim 7, further comprising:
a weight-bearing wheel, wherein:
a side of the garbage collection box adjacent to the flexible tube is formed with a receiving groove,
an opening of the receiving groove faces downward, and
the weight-bearing wheel is located in the receiving groove.

15. The cleaning device according to claim 7, wherein the water level detector is fixed on a fixing member that connects to a sidewall of the recovery tank.

16. The cleaning device according to claim 7, wherein:
the detection probe has a probe central axis that is perpendicular to the tank central axis of the recovery tank, and
a length of the detection probe in an axial direction of he detection probe is shorter than or equal to 10 mm.

17. The cleaning device according to claim 7, wherein:
the detection probe has a probe central axis,
the probe central axis coincides with the tank central axis of he recovery tank, and
the water level detector is a capacitive water level switch.

18. The cleaning device according to claim 7, wherein:
the sewage collection and detection mechanism further comprises a cover that covers the top of the recovery tank,
the cover extends inwardly toward the recovery tank to form a fixing rod, and
the water level detector is mounted on the fixing rod.

19. The cleaning device according to claim 7, wherein:
the sewage collection and detection mechanism further comprises a cover that covers the top of the recovery tank, and
the water level detector is mounted on the cover.

20. A sewage collection and detection mechanism, comprising:
a recovery tank, wherein:
a top of the recovery tank is open, and
the recovery tank has a tank central axis perpendicular to a horizontal plane;
a cover that covers the top of the recovery tank;
a sewage inlet pipe provided at a bottom of the recovery tank; and
a water level detector provided in the recovery tank and mounted on the cover, wherein:
the water level detector has a detection probe, and
the detection probe is located on the tank central axis of the recovery tank.

* * * * *